Patented July 23, 1935

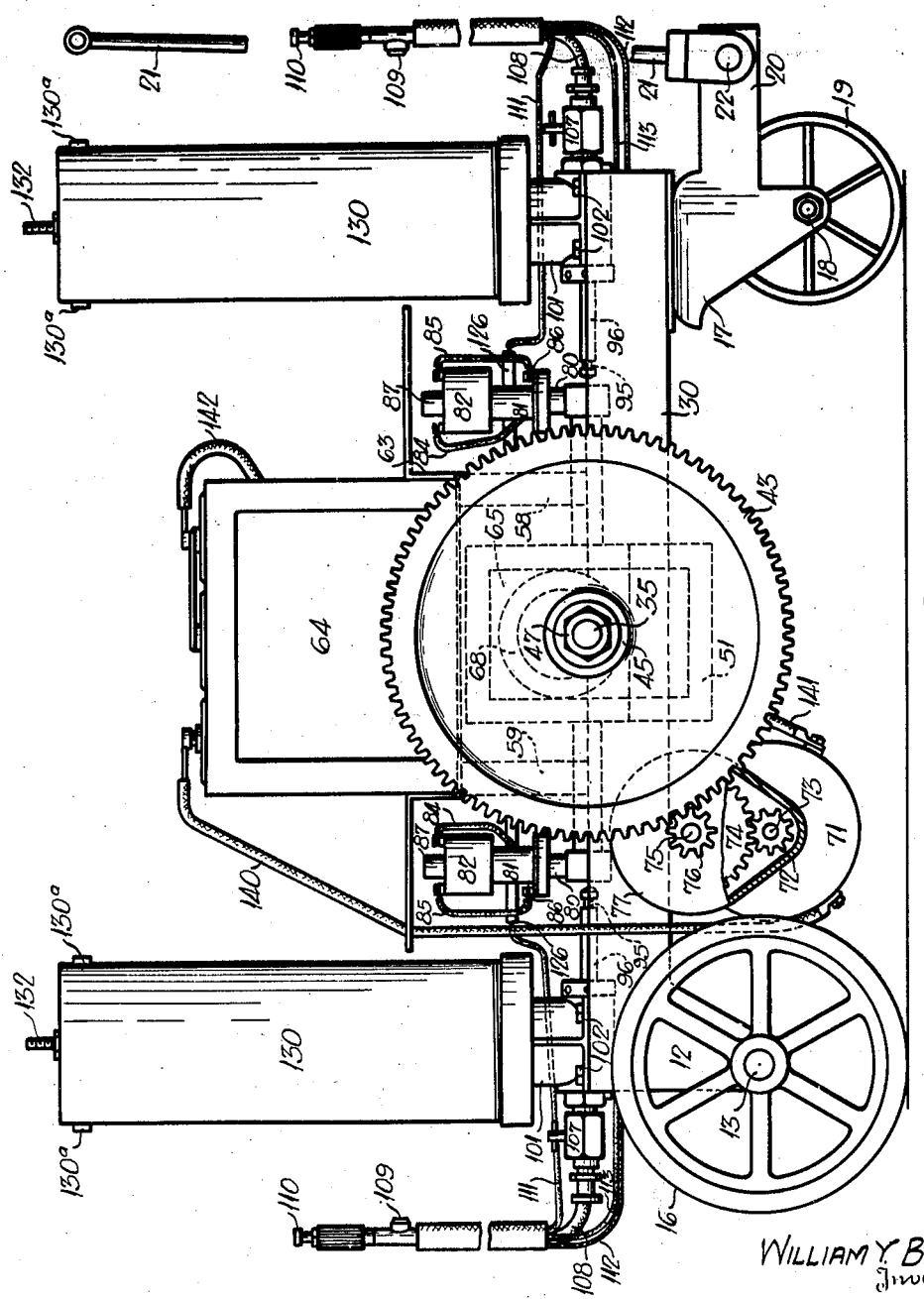

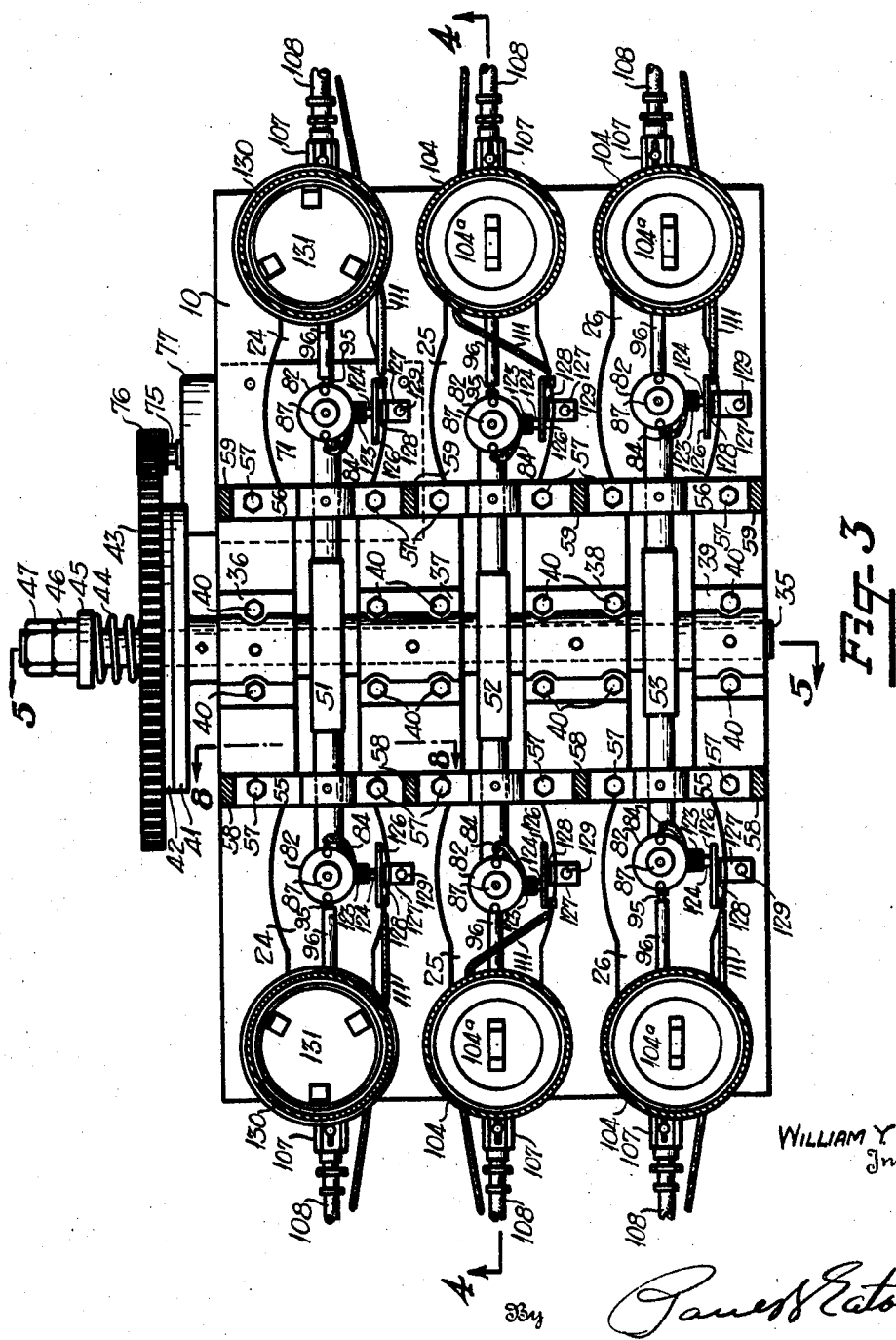

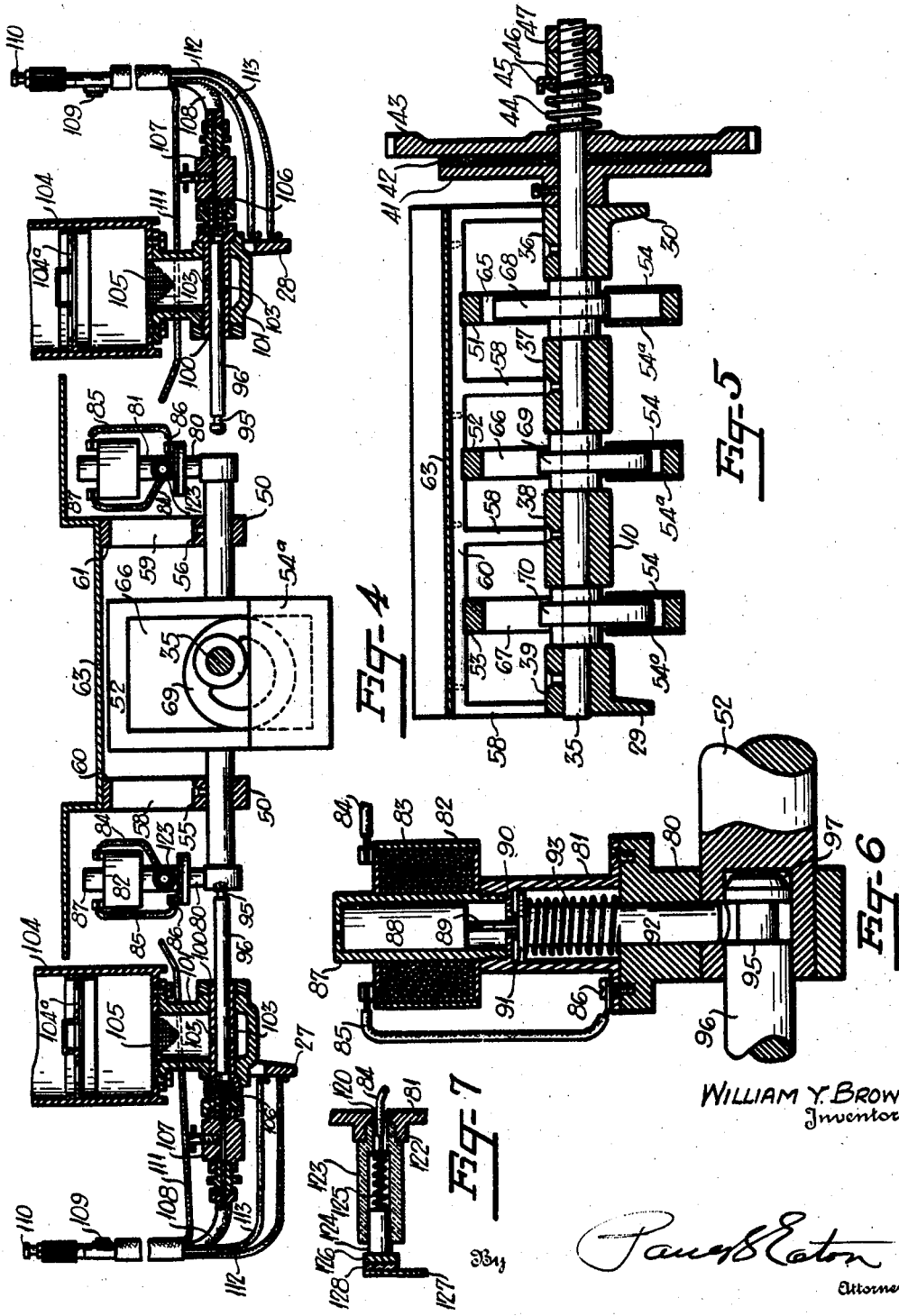

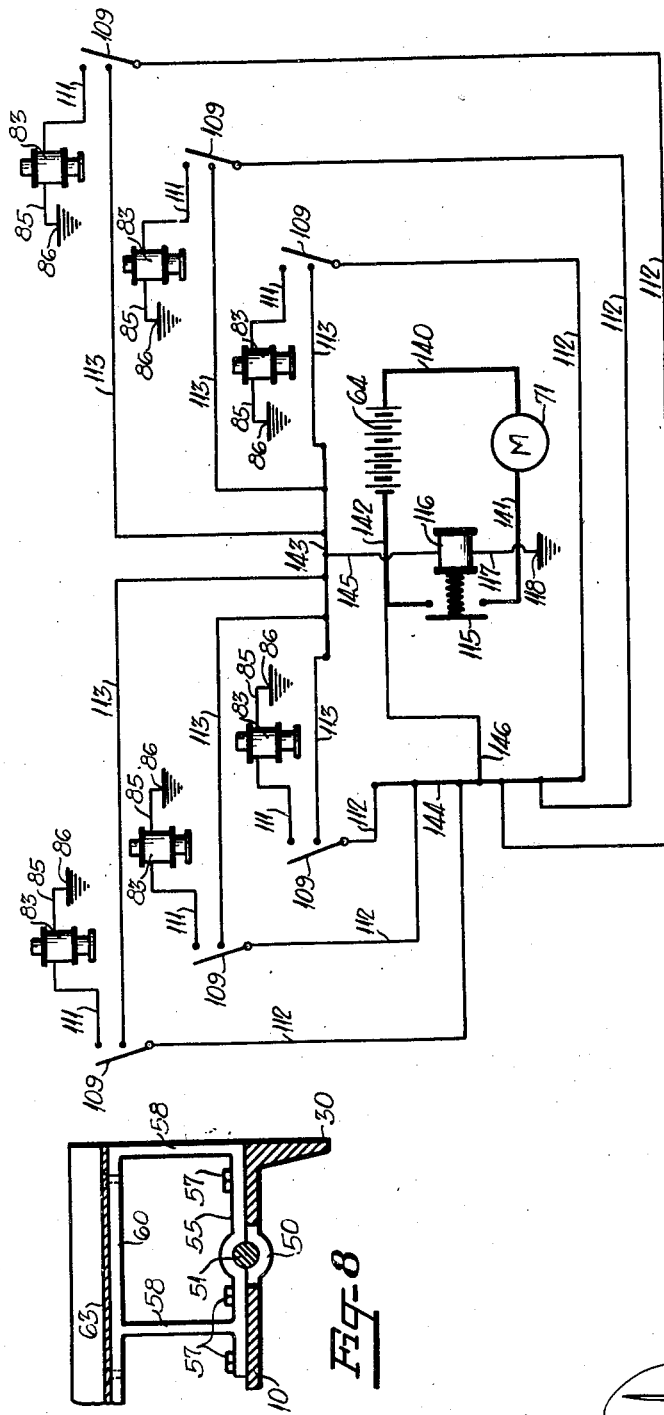

2,008,850

UNITED STATES PATENT OFFICE 2,008,850

MULTIPLE LUBRICATION APPARATUS

William Y. Brown, Charlotte, N. C., assignor of one-third to William C. Honeycutt, Black Mountain, N. C., and one-third to Robert H. Garland, Charlotte, N. C.

Application November 29, 1933, Serial No. 700,299

17 Claims. (Cl. 221—47.1)

This invention relates to a portable grease gun and more especially to a grease gun which is mounted on a suitable truck and carries a storage battery thereon for driving the electric motor for operating the pumping apparatus for applying the lubricant under pressure through a suitable nozzle to the point to be lubricated.

In my Patent Number 1,956,144, Apr. 24, 1934, I show a portable grease gun having a type of grease container provided for part of the apparatus in this application and a grease pump driven by a storage battery. In a patent of mine, Number 1,963,399, June 19, 1934, I show a grease gun similar to the aforementioned grease gun with exception that the lubricant is fed to the grease pump under pneumatic pressure and some of the containers in the present application also embody this feature.

In the aforementioned patents only one container for lubricant is provided, having a grease pump which is driven by an electric motor supplied with power from a storage battery. Many types of lubrication require various types of lubricant, such as, for instance, lubrication for an automobile in which various types of lubricant are required for a complete lubrication job.

I have, therefore, combined the structures shown in said patents by providing a truck having thereon a plurality of lubricant containers for different types of lubricants and of varying viscosities and I have provided a storage battery for driving an electric motor similar in all respects to said patents, but in the present application I have provided means whereby any one of the plurality of the grease pumps can be placed into operation by the closing of the motor switch on the end of the nozzle so that the grease pump associated with the container from whence the nozzle is led is automatically connected to the driving means for the grease pump which means that only one motor and one battery is required for operation of the various lubricant containers and the pump associated therewith.

It is therefore an object of this invention to provide a portable lubrication apparatus having a plurality of lubricant containers and each lubricant container having associated therewith a lubricant pump, with a single means for driving all of said lubricant pumps and means on the delivery nozzle leading from each of the pumps for automatically connecting the pump associated with said delivery nozzle to the driving means and automatically disconnecting same from the driving means when the switch on the nozzle is opened.

It is a further object of this invention to provide a portable lubrication apparatus having a plurality of lubricant containers, each provided with a lubricant pump, and a common driving means and means on the delivery nozzles for each lubricant pump for automatically connecting the lubricant pump to the driving means.

In the drawings I show an electric motor driven by a storage battery because of the convenience of this form of apparatus, but it is to be understood that the electric motor could be driven by a drop cord extending to the electric motor from a suitable outlet, but, as pointed out in said patents, this is undesirable because of the long drop cord being unwieldy and subject to breakage and wear, resulting in short circuits, and electrocution of attendants and operators, whereas the storage battery has the necessary motive power without any outside influence being taken in consideration. It is also to be understood that the present apparatus may be stationary and not portable, if desired.

Some of the objects of the invention having been stated the details will appear more fully in the detailed description hereinafter following, when taken in connection with the accompanying drawings, in which:—

Figure 2 is reverse elevation with portions broken away;

Figure 3 is a sectional plan view, taken along the line 3—3 in Figure 1;

Figure 4 is a longitudinal vertical sectional view, taken along the line 4—4 in Figure 3;

Figure 5 is a transverse sectional view, taken along the line 5—5 in Figure 3;

Figure 6 is a vertical sectional view on an enlarged scale and taken through the electro-magnetic latch mounted on the ends of the reciprocating yokes;

Figure 7 is a horizontal sectional view taken through the brush arrangement on the electro-magnetic latches;

Figure 8 is a transverse sectional view, taken along line 8—8 in Figure 3;

Figure 9 is a schematic wiring diagram of the apparatus.

Figure 1:
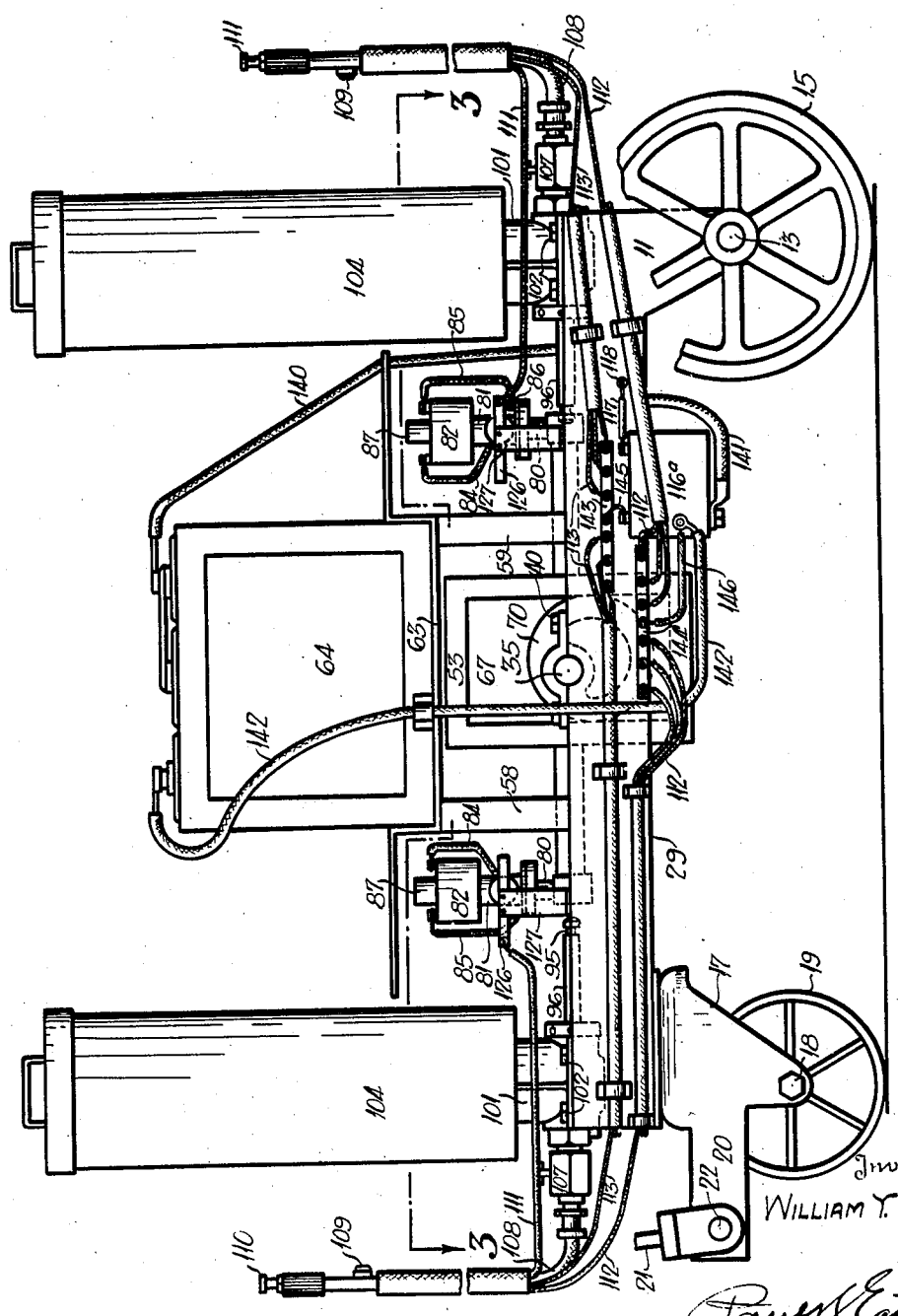
Figure 1 is an elevation of my apparatus.

Referring more specifically to the drawings, the numeral 10 indicates the base plate or framework which, at the rear corners thereof has downwardly extending portions 11 and 12 in which is mounted an axle 13 on which the two rear wheels 15 and 16 are mounted. A caster arrangement 17 is swiveled at the front end and has an axle 18 therein supporting the front wheel 19. This portion 17 has a forwardly projecting portion 20 to which is pivotally mounted tongue 21 as at 22. The base plate 10 has a plurality of longitudinally extending slots 24, 25 and 26 therein and the end portions of the base plate 10 are held together as one integral unit by means of downwardly extending portions 27 and 28, see Figure 4, which are a part of the end flanges 27 and 28. The base plate 10 also has the side flanges 29 and 30.

Centrally and transversely disposed on top of the base plate 10, and in suitable semi-circular bearings therein, is a main drive shaft 35 which is secured to the base plate 10 for rotation by means of cap bearings 36, 37, 38 and 39, these cap bearings being secured to the base plate 10 by any suitable means such as stud bolts 40. Fixedly secured to shaft 35 is a plate 41.

Friction disk 42 is mounted on shaft 35 and is secured to neither the plate 41 nor to gear wheel 43. Gear wheel 43 is also loosely mounted on shaft 35 and is normally pressed towards friction disk 42 by compression spring 44 which is confined on the shaft by means of a washer 45 held in position by means of nuts 46 and 47. This friction drive arrangement is similar to friction drive arrangement shown in my said patents. The portions of the base plate 10 occurring between the slots 24, 25 and 26 are also joined together, in addition to the end flanges 27 and 28 by portions 50 which serve as a lower half of a bearing for the reciprocating yokes 51, 52 and 53, these yokes being confined to the bearings formed from the portion 50 by means of members 55 and 56 which extend entirely across the frame, only a portion of one of these members being shown in Figure 8. These members 55 and 56 are secured to the base plate 10 by any suitable means such as stud bolts 57. These members 55 and 56 are integral with the upper horizontally disposed portions 60 and 61, the portions 60 and 61 serving as a support for a battery container 63 which supports a suitable storage battery 64. The yokes 51, 52 and 53 have the rectangular openings 65, 66 and 67 which are penetrated by the drive shaft 35. On this drive shaft 35 are mounted the eccentrics 68, 69 and 70, these three eccentrics being disposed around shaft 35 at 120 degrees from each other, in other words, one eccentric has its highest point 120 degrees from its adjoining eccentric, the purpose of this being that if more than one grease gun is being operated at one time it will relieve the load on the driving means and tend to equalize the forces at work.

The eccentrics 68, 69 and 70 operate in rectangular openings 65, 66 and 67. The lower portions of these openings are closed by plates 54 and 54a and form a lubricant receptacle for lubricating the eccentrics 68, 69 and 70.

A suitable direct current motor 71 which in the present instance, is a compound wound electric motor, is supported by the base plate 10 and has a pinion 72 mounted on a shaft 73, said pinion 72 meshing with a pinion 74 mounted on a shaft 75 and on this same shaft is a pinion 76 which meshes with gear wheel 43 for driving the drive shaft 35 and the grease pump which are connected thereto. A suitable housing 77 houses the train of gearing just described. On each end of the yokes 51 to 53 inclusive, there is fixedly secured an electro-magnetic latch comprising a collar 80 which has a vertically disposed bore therein and a shell member 81 is secured on the upper end thereof and on the upper end of the shell member is mounted a casing 82 for a solenoid winding 83 and a wire 84 connected to one side of the solenoid winding while a wire 85 is connected to the other side which wire has its other end grounded as at 86. Disposed within the solenoid winding 83 is a shell member 87 in which is slidably mounted an iron core 88 said iron core having a pin 89 integral therewith which projects through partition member 90 in shell 81 and fits against an enlarged end 91 of a plunger 92 which is slidably mounted in the vertically disposed bore in collar 80. A compression spring 93 is confined between collar 80 and enlargement 91 which normally forces latch 92 upwardly but upon energization of coil 83 core 88 will be moved downwardly and pin 89 will force latch 92 downwardly to engage groove 95 in the piston 96 when the piston enters bore 97 in the end of the yoke. As the mechanism on each end of all of the yokes are identical the above description and reference characters apply to all of the electro-magnetic means mounted on the ends of the yokes 51 to 53 inclusive.

As all of the grease pumps of which the piston 96 is a part, are identical, a description of one of the grease pumps, the structure which is very similar to the grease pump structure set forth in said patents, will suffice for all of the grease pumps. The piston 96 is mounted in a sleeve 100 disposed in casing 101, which casing is secured to the base plate 10 by means of suitable stud bolts 102. Sleeve 100 has holes 103 therein through which grease from container 104, after passing through strainer 105, is admitted to sleeve 100 and the stroke of the piston 95 causes the grease to be expelled through check valve 106 and through fitting 107 into delivery hose 108 which delivery hose has a triple point push button 109 near the end thereof and a suitable delivery nozzle 100 on the end thereof. Each one of the delivery hose has three wires 111, 112 and 113 integral therewith or suitably supported thereby, wire 111 controlling the electro-magnetic latch with which it is associated and wires 112 and 113 controlling a solenoid switch 115, shown in the wiring diagram, and more fully explained in said patents. This solenoid switch is actuated by a solenoid 116, both of which are enclosed in a suitable box 116a secured to the side of the framework.

Wire 84 is led back into shell 81 and through a suitable opening 120 in shell 81, said opening havig an interiorly threaded flange 122 on the exterior thereof surrounding said hole 120 in which is threadably mounted an insulating sleeve 123 in which is slidably mounted a contact point 124 which is connected to wire 84. Surrounding wire 84 is a compression spring 125 which normally forces contact point 124 at all times against bus bar 126 which is insulated from bracket 127 by means of insulation 128. Bracket 127 is secured as at 129 to base plate 10. Wire 111 is connected to bus bar 127.

In the drawings four of the containers 104 are shown as being of a type set forth in full, in my patents in which a follower 104a is provided for causing the lubricant to be fed toward the sleeve 100. It is to be noted, however, in Figures 2 and 3, that the containers 130 are of a structure acording to the structure set forth in full in my Patent Number 1,963,399 in which pneumatic means are provided for forcing pistons 131 downwardly to force grease into the grease pump, where a very thick non-flowable grease is being employed. In this type of container 130, as fully set forth in my patent, the piston 131 is forced downwardly by air being admitted through valve 132 into a compartment above the piston 131 and this compressed air forces the thick grease downwardly in the container and into the grease pump. Each container 130 has projections 130a integral therewith which are adapted to be engaged by a suitable wrench when the container is removed for refilling with lubricant.

A wire 140 is led from battery 64 to motor 71, and from the other side of motor 71 a wire 141 is led to solenoid switch 115 and from the other side of solenoid switch 115 a wire 142 is led to the battery. As will be observed in Figure 1, there is mounted on the framework, and insulated therefrom, a bus bar 143 to which all wires 113 are connected and also mounted on this framework, and insulated therefrom, is a bus bar 144 to which all wires 112 are connected and a wire 145 is led from bus bar 143 to solenoid switch 115 and another wire 117 leads from the other side of solenoid 116 and is grounded as at 118. A wire 146 is led from bus bar 144 to one side of solenoid switch 115.

It is seen therefore, that when an operator seizes a delivery hose or conduit and presses the switch thereon, that the grease pump associated with said delivery hose or conduit, will be automatically connected to the reciprocating yoke associated therewith. This yoke will begin reciprocation upon closing of the switch on the delivery nozzle and the grease gun associated with said delivery nozzle will also be automatically connected with the reciprocating yoke. The other yokes will also be reciprocating at the same time but will not be connected to any grease gun unless some other operator should at the same time be applying a different kind of lubricant to the same machine or other machines being lubricated, but in case one or more operators were using one or more of the delivery hose or conduits and should close the switch thereon, it would have no effect on the motor switch 115 as the solenoid 116 would already be energized but the electromagnetic latch associated with said delivery nozzle would be energized and therefore the grease gun associated therewith would begin operation. It is thus seen that one or more of the grease guns can be operated at the same time by different individuals for different purposes, all from one source of power and from one drive shaft.

In the drawings and specification there has been set forth a preferred embodiment of the invention, and although specific terms are employed, they are used in a generic and descriptive sense only and not for purposes of limitation, the scope of the invention being set forth in the appended claims.

I claim:—

1. A lubrication apparatus having a plurality of grease pumps, a delivery hose for each pump, a common driving means for all of the grease pumps, an electric motor for driving the common driving means, a motor circuit, a circuit disposed on each delivery hose for controlling the motor circuit, a switch in said circuit disposed on the hose, electro-magnetic means disposed on the common driving means and connected in series with the circuit disposed on the delivery hose for automatically connecting the grease pump for a delivery hose to the driving means when the circuit on a hose is closed and automatically disconnecting the grease pump from the driving means when the circuit on the hose is opened.

2. Lubrication apparatus comprising a plurality of containers, a pump associated with each container, a delivery hose connected to each pump, interconnected means for driving all of the pumps and normally disconnected from the pumps, an electric motor for actuating the driving means, a plurality of electro-magnetic latches on the driving means, there being a latch for each pump, a source of electrical energy for driving the motor, a switch on each delivery hose, a circuit leading through said source, said switch and said latch, a motor circuit leading through said source and said motor, a third circuit leading through said switch on the hose and controlling the motor circuit, the closing of a switch on a delivery hose closing the motor circuit and actuating one of said latches to connect the selected pump to the driving means.

3. Lubrication apparatus comprising a plurality of containers, a pump associated with each container, a delivery hose connected to each pump, interconnected means for driving all of the pumps and normally disconnected from the pump, an electric motor for actuating the driving means, a plurality of electro-magnetic latches on the driving means, there being a latch for each pump, a source of electrical energy for driving the motor, a switch on each delivery hose, a circuit leading through said source, said switch and said latch, a motor circuit leading through said source and said motor, a third circuit leading through said switch on the hose and controlling the motor circuit, the closing of a switch on a delivery hose closing the motor circuit and actuating one of said latches to connect the selected pump to the driving means while the driving means are in motion.

4. Lubrication apparatus comprising a portable truck, a base plate mounted on the truck, a plurality of reciprocating members mounted on the base plate, a plurality of lubricant containers mounted on each end of the base plate and in alinement with said reciprocating members, a pump at the lower end of each container, a piston forming a part of each pump and normally disconnected from the reciprocating members, a latch on each end of each of the reciprocating members for engaging said pistons, means for normally holding the latches in a position where they will not engage the pistons, a delivery hose for each pump, means for simultaneously driving all of said reciprocating members, means on each delivery hose for starting and stopping the means for driving said reciprocating members and actuating a latch for connecting a reciprocating member to the piston of the pump with which the actuated hose is associated.

5. Lubrication apparatus comprising a portable truck, a base plate mounted on the truck, a plurality of reciprocating members mounted on the base plate, a plurality of lubricant containers mounted on each end of the base plate and in alinement with said reciprocating members, a pump at the lower end of each container, a piston forming a part of each pump and normally disconnected from the reciprocating members, a latch on each end of each of the reciprocating members for engaging said pistons, means for normally holding the latches in a position where they will not engage the pistons, a delivery hose for each pump, means for simultaneously driving all of said reciprocating members, means on each delivery hose for starting and stopping the means for driving said reciprocating members and actuating a latch for connecting a reciprocating member to the piston of the pump with which the actuated delivery hose is associated while the reciprocating member is in motion.

6. Lubrication apparatus comprising a pair of lubricant containers, a lubricant pump associated with each container, a reciprocating member disposed between the containers and normally disconnected from the pumps, means for driving the reciprocating member, a delivery conduit for each pump, means on the reciprocatory member for engaging and driving said pumps, means on the delivery conduits for effecting operation of the means for driving the reciprocatory member and for effecting operation of the means on the reciprocatory member for engaging and driving the pump associated with the delivery conduit.

7. Lubricating apparatus comprising a plurality of lubricant containers, a pump associated with each container, common driving means for all of the pumps normally disconnected from the pumps, means including a member on each delivery conduit for starting and stopping the driving means and for connecting and disconnecting the pump with which it is associated to the driving means.

8. Lubrication apparatus comprising a plurality of lubricant containers, a pump associated with each container, a plurality of reciprocatory members normally disconnected from the pumps, means on the reciprocatory members for engaging and driving the pumps, a delivery conduit connected to each pump, means including a member on each delivery conduit for moving the means on the reciprocatory members into engagement with its pump.

9. Lubrication apparatus comprising a plurality of lubricant containers, a pump associated with each container, a plurality of reciprocatory members normally disconnected from the pumps, means on the reciprocatory members for engaging and driving the pumps, a delivery conduit connected to each pump, means including a member on each delivery conduit for moving the means on the reciprocatory members into engagement with its pump while the reciprocatory members are in motion.

10. Lubrication apparatus comprising a plurality of lubricant containers, a pump associated with each container, a delivery conduit connected to the discharge end of each of said pumps, means normally disconnected from the pumps for driving the pumps, means including a member on a delivery conduit for starting the driving means and connecting the driving means to the pump for the selected conduit.

11. Lubrication apparatus comprising a plurality of lubricant containers, a pump associated with each container, a delivery conduit connected to the discharge end of each of said pumps, means normally disconnected from the pumps for driving the pumps, means including a member on a delivery conduit for starting the driving means and connecting the driving means to the pump for the selected conduit while the driving means are in motion.

12. Lubrication apparatus comprising a plurality of lubricant pumps, common reciprocating driving means for all of the pumps, a latch connection between the driving means and each of the pumps, means normally holding the latches in unlatched position with relation to the driving means, and selectively operable means for setting the latches whereby upon reciprocation of the driving means a selected pump will be connected to the driving means.

13. Lubrication apparatus comprising a plurality of lubricant containers, a pump associated with each container, a delivery hose connected to each pump, single means for driving all of the pumps and normally disconnected from all of the pumps and means including a member on each delivery hose for starting and stopping the driving means and connecting and disconnecting its associated pump to and from the driving means.

14. Lubrication apparatus comprising a plurality of lubricant containers, a pump associated with each container, a delivery hose connected to each pump, single means for driving all of the pumps and normally disconnected from all of the pumps and means including a member on each delivery hose for starting and stopping the driving means and connecting and disconnecting its associated pump to and from the driving means while the driving means are in motion.

15. Lubrication apparatus comprising a plurality of grease pumps, a delivery hose for each pump, common driving means for all of the pumps and normally disconnected from the pumps, and means including a member on each delivery hose for automatically connecting the driving means to the pump for the delivery hose when the means on the delivery hose is actuated.

16. Lubrication apparatus comprising a plurality of grease pumps, a delivery hose for each pump, common driving means for all of the pumps normally disconnected from the pumps, and means including a member on each delivery hose for automatically connecting the driving means while in motion, to the pump for the delivery hose when the means on the delivery hose is actuated.

17. Lubrication apparatus comprising a plurality of containers, a pump associated with each container, a delivery hose connected to each pump, interconnected means for driving all of the pumps and normally disconnected from the pumps, an electric motor for actuating the driving means, a plurality of electro-magnetic latches on the driving means, there being a latch for each pump, a source of electrical energy for driving the motor, a switch on each delivery hose, a circuit leading through said source, said switch and said latch, a motor circuit leading through said source and said motor, a third circuit leading through said switch on the hose and controlling the motor circuit, the closing of a switch on a delivery hose closing the motor circuit and actuating one of said latches to connect the selected pump to the driving means, a wheeled truck on which the lubrication apparatus is mounted and a storage battery mounted on the truck for driving the motor.

WILLIAM Y. BROWN.